US009077464B2

(12) United States Patent
Shi et al.

(10) Patent No.: US 9,077,464 B2
(45) Date of Patent: Jul. 7, 2015

(54) METHOD FOR PROVIDING MULTICAST SERVICES

(75) Inventors: Yun Tao Shi, Beijing (CN); Ning Liao, Beijing (CN); Jun Li, Cranbury, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/377,144

(22) PCT Filed: Jun. 9, 2010

(86) PCT No.: PCT/EP2010/058082

§ 371 (c)(1), (2), (4) Date: Dec. 8, 2011

(87) PCT Pub. No.: WO2010/142722

PCT Pub. Date: Dec. 16, 2010

(65) Prior Publication Data

US 2012/0084815 A1 Apr. 5, 2012

(30) Foreign Application Priority Data

Jun. 10, 2009 (EP) .................................... 09305524

(51) Int. Cl.
*H04N 5/445* (2011.01)
*H04H 60/72* (2008.01)

(52) U.S. Cl.
CPC .................................... *H04H 60/72* (2013.01)

(58) Field of Classification Search
CPC ......................... H04N 4/44543; H04N 21/482
USPC ........ 725/37–61; 455/458, 515; 709/217–232
See application file for complete search history.

(56) References Cited

U.S. PATENT DOCUMENTS

| | | | | |
|---|---|---|---|---|
| 5,623,489 | A * | 4/1997 | Cotton et al. | 370/381 |
| 6,442,598 | B1 * | 8/2002 | Wright et al. | 709/217 |
| 6,563,830 | B1 | 5/2003 | Gershon et al. | |

(Continued)

FOREIGN PATENT DOCUMENTS

| | | |
|---|---|---|
| CN | 1335018 | 2/2002 |
| CN | 1839650 | 9/2006 |

(Continued)

OTHER PUBLICATIONS

Search Report: Aug. 9, 2010.

(Continued)

*Primary Examiner* — Annan Shang
(74) *Attorney, Agent, or Firm* — Robert D. Shedd; Jeffrey M. Navon; Catherine A. Cooper

(57) ABSTRACT

It is provided a method for providing a service guide in a network providing a plurality of multicast services, said network comprising at least one client device connected to a first device, wherein a subset of said plurality of multicast services is being multicast to said at least one client device via said first device, and the service guide provides a list of the plurality of multicast services in a second order; and at the side of a client device, the method comprises the steps of determining a list of the plurality of multicast services in a first order, wherein the order is changed from the second order to the first order based on the multicast services of the subset; and presenting said list of multicast services in said first order.

15 Claims, 5 Drawing Sheets

(56) References Cited

U.S. PATENT DOCUMENTS

| | | | | |
|---|---|---|---|---|
| 6,839,757 | B1 * | 1/2005 | Romano et al. | 709/226 |
| 7,149,772 | B1 * | 12/2006 | Kalavade | 709/203 |
| 7,549,160 | B1 * | 6/2009 | Podar et al. | 726/4 |
| 7,681,680 | B2 * | 3/2010 | Ishikawa et al. | 180/219 |
| 7,873,710 | B2 * | 1/2011 | Kiley et al. | 709/220 |
| 7,912,485 | B2 * | 3/2011 | Sinnarajah et al. | 455/458 |
| 8,374,172 | B2 * | 2/2013 | Jana et al. | 370/352 |
| 8,804,720 | B1 * | 8/2014 | Rainovic et al. | 370/390 |
| 8,893,174 | B2 * | 11/2014 | Parker et al. | 725/34 |
| 2005/0177853 | A1 * | 8/2005 | Williams et al. | 725/81 |
| 2005/0201321 | A1 | 9/2005 | Sinnarajah et al. | |
| 2005/0204042 | A1 * | 9/2005 | Banerjee et al. | 709/226 |
| 2005/0265374 | A1 * | 12/2005 | Pelt | 370/437 |
| 2005/0289589 | A1 | 12/2005 | Vermola | |
| 2006/0117342 | A1 | 6/2006 | Park et al. | |
| 2006/0155850 | A1 * | 7/2006 | Ma et al. | 709/226 |
| 2006/0156370 | A1 * | 7/2006 | Parantainen | 725/132 |
| 2007/0204312 | A1 | 8/2007 | Wheelock | |
| 2007/0232221 | A1 | 10/2007 | Miyata | |
| 2008/0198847 | A1 | 8/2008 | Yamagishi et al. | |
| 2008/0276276 | A1 | 11/2008 | Lim et al. | |
| 2009/0100467 | A1 | 4/2009 | Cake | |
| 2009/0113476 | A1 * | 4/2009 | Vogel | 725/39 |
| 2009/0144768 | A1 * | 6/2009 | Nagaraja | 725/39 |
| 2009/0307719 | A1 * | 12/2009 | Clark et al. | 725/32 |
| 2010/0014661 | A1 | 1/2010 | Terekhova et al. | |
| 2010/0180314 | A1 * | 7/2010 | Kim et al. | 725/110 |

FOREIGN PATENT DOCUMENTS

| | | |
|---|---|---|
| CN | 101120597 | 2/2008 |
| CN | 101141588 | 3/2008 |
| CN | 101299805 | 11/2008 |
| CN | 101322407 | 12/2008 |
| CN | 101404780 | 4/2009 |
| EP | 1901457 | 3/2008 |
| JP | 2001036834 | 2/2001 |
| JP | 2003143587 | 5/2003 |
| JP | 2007124177 | 5/2007 |
| JP | 2007274650 | 10/2007 |
| JP | 2008125033 | 5/2008 |
| JP | 2008199541 | 8/2008 |
| KR | 2006115423 | 11/2006 |
| KR | 2006099765 | 7/2007 |
| WO | WO0040017 | 7/2000 |
| WO | WO2005032128 | 4/2005 |
| WO | WO2005/045603 | 5/2005 |
| WO | WO2008029230 | 3/2008 |
| WO | WO2008044142 | 4/2008 |
| WO | WO2008119436 | 10/2008 |

OTHER PUBLICATIONS

Jieun Lee, et al., “Advanced Scheme to Reduce IPTV Channel Zapping Time,” Proceedings 10th Asia-Pacific Network Operations and Management Symposium, APNOMS 2007. (Lecture Notes in Computer Science vol. 4773), 235-243.

* cited by examiner

| ESG service Render ID | Global_content_ID | Ethernet multicast address |
|---|---|---|
| 1 | Program_ID_1 | Group_address_1 |
| 2 | Program_ID_2 | Group_address_2 |
| 3 | Program_ID_3 | Group_address_3 |
| ... | ... | ... |
| n-1 | Program_ID_n-1 | Group_address_n-1 |
| n | Program_ID_n | Group_address_n |

| ESG service Render ID | Current_content_ID | Ethernet multicast address |
|---|---|---|
| 1 | Program_ID_m | Group_address_m |
| 2 | Program_ID_j | Group_address_j |
| 3 | Program_ID_k | Group_address_k |
| ... | ... | ... |
| n-1 | Program_ID_n-1 | Group_address_n-1 |
| n | Program_ID_n | Group_address_n |

METHOD FOR PROVIDING MULTICAST SERVICES

This application claims the benefit, under 35 U.S.C. §365 of International Application PCT/EP2010/058082, filed Jun. 9, 2010, which was published in accordance with PCT Article 21(2) on Dec. 16, 2010 in English and which claims the benefit of European patent application No. 09305524.2, filed Jun. 10, 2009.

TECHNICAL FIELD

The present invention relates to data communication, and more particularly, relates to a method for providing multicast services.

BACKGROUND

An Electronic Programme Guide (EPG) or Interactive Programme Guide (IPG) or Electronic Service Guide (ESG) is a digital guide to multicast and broadcast programs, typically displayed on-screen with functions allowing a viewer to navigate, select, and discover content (also called program, channel, service) by time, title, channel, genre, etc. by use of their remote control, a keyboard, or other input devices such as a phone keypad. The on-screen information may be delivered by a dedicated channel or assembled by the receiving equipment from information sent by each program channel.

By navigating through an ESG on a receiving device, users can see more information about the current program and about future programs. Typical elements of an ESG comprise a graphical user interface which enables the display of program titles, descriptive information such as a synopsis, actors, directors, year of production, and so on, the channel name and the programs on offer from subchannels such as pay-per-view and VOD (video-on-demand) services, program start times, genres and other descriptive metadata.

The ESG information is typically displayed on a grid with the option to select more information on each program. The ESG allows viewers to browse program summaries, to search by genre or channel, immediate access to the selected program, reminders, and parental control functions.

The ESG is typically sent within a broadcast transport stream, or in a special data channel alongside it. Of course, it can also be multicast to a selected groups of client devices. For example, The ATSC (American Television Standards Committee) standard for DTV (digital TV) uses tables sent in each station's PSIP (program and system information protocol). Herein, the PSIP is the protocol used for carrying metadata about each channel in the broadcast transport stream of a TV station and for publishing information about television programs so that viewers can select what to watch by title and description. Further, these tables are capable of containing the program start time and title, and additional program descriptive "metadata".

In the broadcast network, all channels are always existent (or called available) on wire or wireless medium, thus the latency of channel changing is usually small. However, in a multicast network, upon a channel change request, the Internet Group Management Protocol (IGMP) is used to leave the current channel and join the selected channel. The IGMP is a communication protocol used to manage the membership of Internet Protocol multicast groups. The IGMP is used by a client device and its adjacent multicast routers to establish multicast group memberships when the client intends to join a multicast channel.

FIG. 1 is a message sequence chart illustrating a channel changing in an IP-based mobile TV network. A TV head end provides a plurality of channels, and a terminal is connected to the TV head end for receiving a channel. At the beginning the terminal views a channel A. Then the user browses the ESG and decides to change to the channel B. Corresponding instructions for changing channel are generated according to the selection of channel B in the ESG. Generally, the instructions for changing channel consist of instruction for leaving the current channel and instruction for joining the new channel by using the IGMP. The channel switching delay or channel changing delay is generally related to a time period starting at the time of terminal's sending an IGMP leave instruction and ending at the time of terminal's beginning to display the content of the new program.

Further, U.S. Pat. No. 6,563,830 discloses multicast registration of all multicast flows in an asynchronous transfer mode based emulated LAN, and in the application, it briefs the IGMP snooping.

WO2005045603 discloses a method for service selection and sorting. Specifically, service is attached with a type of a group comprising subscribed and unsubscribed. In order to facilitate a user to distinguish subscribed services from services of other types, the list of services is modified, e.g. highlighting subscription items, based on locally stored information concerning the accessibility of services (i.e. being stored in the user terminal) and user's service accessibility setting or input.

It is desirable to reduce the average time for tuning to a program.

SUMMARY

According to an aspect of present invention, it provides a method for providing a service guide in a network providing a plurality of multicast services, said network comprising at least one client device connected to an intermediate device, wherein a subset of said plurality of multicast services is being multicast to said at least one client device via said intermediate device, and the service guide provides a list of the plurality of multicast services in a second order; and at the side of a client device, the method comprises the steps of determining a list of the plurality of multicast services in a first order, wherein the order is changed from the second order to the first order based on the multicast services of the subset; and presenting said list of multicast services in said first order.

According to the aspect of present invention, it reduces average time for tuning to a multicast service.

It is to be understood that more aspects and advantages of the invention will be found in the following detailed description of the present invention.

BRIEF DESCRIPTION OF THE DRAWINGS

The accompanying drawings, which are included to provide a further understanding of the invention and are incorporated in and constitute a part of this application, illustrate embodiment of the invention together with the description which serves to explain the principle of the invention. Therefore, the invention is not limited to the embodiment. In the drawings.

DETAILED DESCRIPTION

The embodiment of the present invention will now be described in detail in conjunction with the drawings. In the following description, some detailed descriptions of known functions and configurations may be omitted for clarity and conciseness.

An embodiment of present invention described below is placed in a wireless network that provides multicast services.

Figure 2:
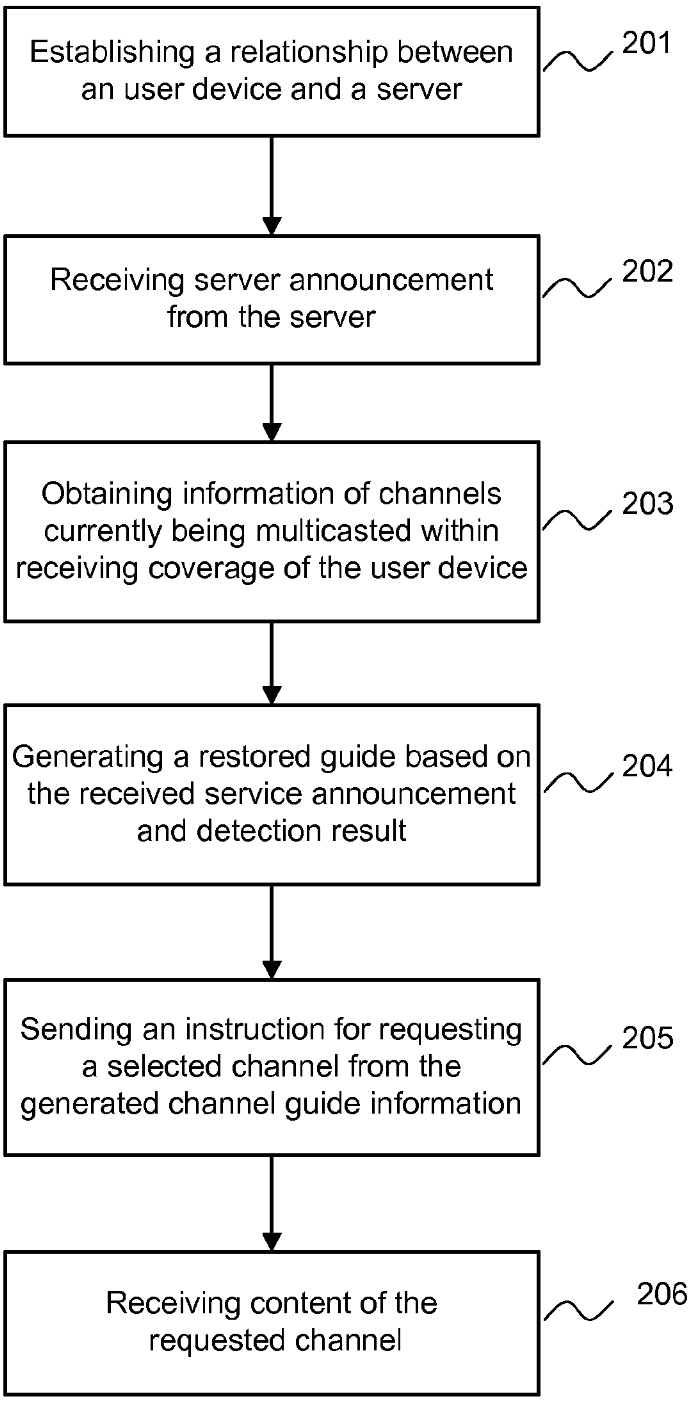
FIG. 2 is a flow chart illustrating a method for providing a multicast service according to an embodiment of the present invention.

FIG. 2 is a flow chart illustrating a method for providing a multicast service according to the embodiment of present invention.

In the step 201, a user device establishes a relationship with a server, for example, by establishing a connection with the server. The connection may be a TCP connection, a UDP connection etc. Other types of connections could also be used. The connection is used to convey service contents and/or signals. There are two kinds of servers in the mobile TV network, i.e. the service management server for managing the ESG and its delivery, and the streaming server for streaming programs to user devices. Here, the server in relationship with the user device is the service management server. In this embodiment, the service management server and the streaming server are incorporated into a single server device.

Figures 3, 4:
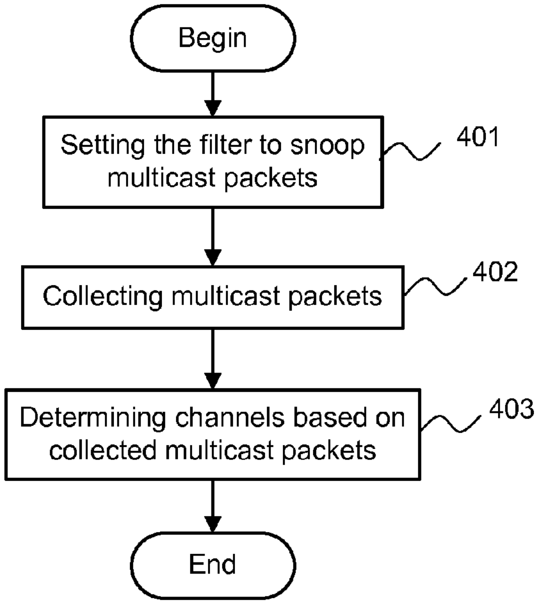
FIG. 3 illustrates channel guide information received from the server according to the present embodiment.
FIG. 4 is a flow chart illustrating a method carried out by a user device to obtain information about channels according to the present embodiment.

After the establishment of the relationship, the user device receives a server announcement, i.e. channel guide information comprising a list of channels and information for accessing these channels in the step 202. For example, the channel guide information is in the form of an ESG. The ESG can be used to navigate the channels. The FIG. 3 illustrates channel guide information received from the server according to the present embodiment. In this global table, 'ESG service Render ID' is used to indicate the presentation order in the ESG; 'Global_content_ID' is used to uniquely identify a program channel; 'Ethernet multicast addresses' is used to indicate the address of a multicast group, which is generally used by the IGMP to join or leave a channel.

Figure 1:
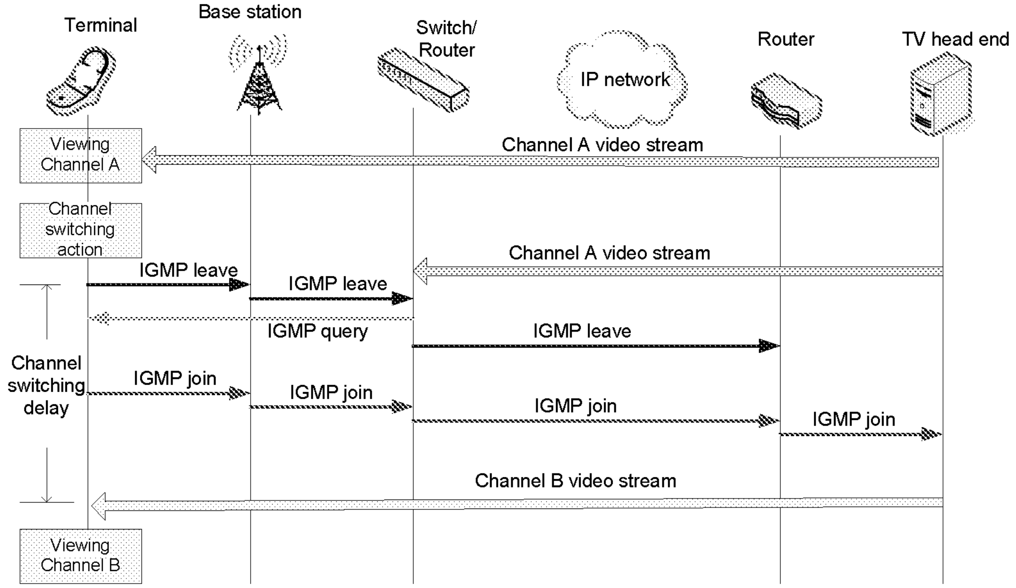
Fig. 1 (Prior Art)
FIG. 1 is a message sequence chart illustrating a channel changing in an IP-based mobile TV network according to the prior art.

In the step 203, the user device obtains information about channels currently being multicast within the receiving coverage of the user device, which is normally equal to the channels being multicast by the access device, such as a base station as shown in the FIG. 1. In other words, in a wireless network where a user device is connected to a wireless access point, channels being multicast within the receiving coverage of the user device are generally channels that are being received by all user devices connected to the wireless access point. FIG. 4 is a flow chart illustrating a method for obtaining information about channels currently being multicast within the receiving coverage of the user device according to the present embodiment.

In the step 401, the user device sets the filter of the user device to snoop multicast packets. It is known to a person skilled in the art that the network card driver can be configured to or programmed to receive all packets, or certain packets satisfying some conditions, such as the destination address is equal to a certain value. In this example, the user device is configured to only receive the multicast data packets whose destination address belongs to multicast group addresses contained in an ESG received in the step 201, so as to avoid the calculation burden caused by the unicast packets or other irrelevant multicast packets, such as a multicast service not contained in the ESG.

In the step 402, the user device collects multicast packets according to the multicast group addresses of services in the ESG. To be specific, the user device captures all multicast packets and analyzes destination addresses thereof. The filter is used to make sure packets whose destination address belong to multicast group addresses of services are collected.

In the step 403, the user device determines available channels based on the collected multicast packets, i.e. the channels are determined based on the destination addresses of the collected packets. The determined channels are the channels currently being multicast within the receiving coverage of the user device, and they are also deemed as the channels being multicast by the access device.

Other methods can also be used for determining the channels being multicast within the receiving coverage of the user device. For example, the filter is set to collect all packets including unicast packets and multicast packets, and then the multicast addresses contained in the ESG are used to match the destination addresses of the collected packets. In this way, the channels being multicast within the receiving coverage of the user device can also be determined.

Alternatively, due to contents of these channels that are all available through the wireless access point (i.e. the wireless access point is currently receiving content of these channels from one or more servers), the user device may derive a list of channels currently available through the wireless access point. The list of channels is, for example, sent to the user device through a message.

Figures 5, 6:
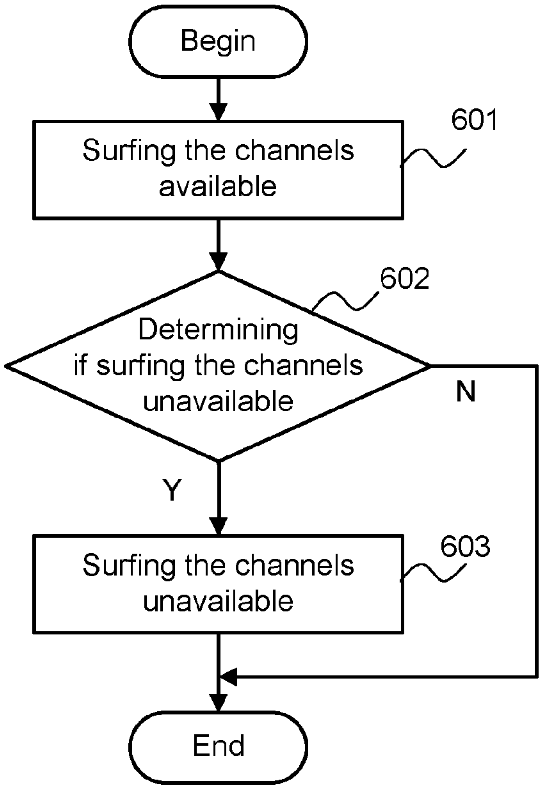
FIG. 5 illustrates reordered channel guide information according to the present embodiment.
FIG. 6 is a flow chart illustrating a method for surfing channels according to the present embodiment.

In the step 204, the user device generates reordered channel guide information based on the received service announcement from the step 202 and available channel information from the step 203. Assuming the channels with identifiers of m, j and k are currently being multicast by the wireless access point, the FIG. 5 illustrates reordered channel guide information according to the present embodiment. In this embodiment, the channels currently being multicast are arranged at the top of the list. According to a variant, these channels are arranged to some other predetermined positions of the list which the user is likely to select.

In the step 205, the user device sends an instruction for requesting a selected channel upon the user's selection of a channel among the reordered channel guide information.

In the step 206, the user device receives content of requested channel.

In addition, the steps 203 and 204 are periodically carried out while the user views a channel, so that the channel guide information displayed on the user device is dynamically updated. Alternatively, the channel guide information is dynamically updated by receiving an update message about channel guide information from the wireless access point, the update message is sent when the availability of channels on wireless access point changes. For example, a channel changes from available state to unavailable state, and vice versa.

According to a variant of the present embodiment, instead of steps of 202, 203 and 204, the wireless access device itself generates the reordered channel guide information based on the information about channels being multicast by itself, and transmits the reordered channel guide information to the user device through a message.

Since the users within coverage of a wireless access point that are very likely to view the same or similar channels related to the location of the user device, e.g. the user in or by a shopping mall is likely to view the advertisement or discount information of this shopping mall, such channels of great interest are presented at the top of the channel list so that the user can easily select them. In addition, users are prone to select the channel at the top of the channel list. So the time period for tuning to or changing to any one of the channels that are available in the wireless access point is shorter than other channel that is unavailable because obtaining the content of an unavailable channel introduces additional time for requesting the new channel from the server as shown in FIG. 1.

Furthermore, the user device can generate a list of available channels from the whole list of channels for channel surfing based on the result of the step 203. FIG. 6 is a flow chart illustrating a method for surfing channels according to the present embodiment.

Upon receiving an instruction for surfing, the user device displays the channels within available channel list one by one in the step 601.

In the step 602, the user device determines if an instruction for surfing the rest of the channels is received. Herein, the rest channels are channels that are unavailable in the wireless access point.

Upon receiving an instruction for surfing the rest, the user device displays the rest of the channels one after another in the step 603.

According to a variant of the present embodiment, the user device still uses the original single list with an added field in the list, the field being used to indicate whether the corresponding channel is currently available or not.

Because a user is likely to find a channel of interest during the surfing of available channels, it's sometimes unnecessary to surf the unavailable channels so that the overall time used for channel changing including sending leave/join IGMP messages by the wireless access point is reduced.

According to a variant of the present embodiment, the method can be used in a wired network wherein the user device is in wired connection with the network. The user device can obtain a list of channels available in the adjacent router or switcher by snooping the packets when its network card set to promiscuous mode. Besides, the list can also be informed by the adjacent router or switcher.

Figure 7:
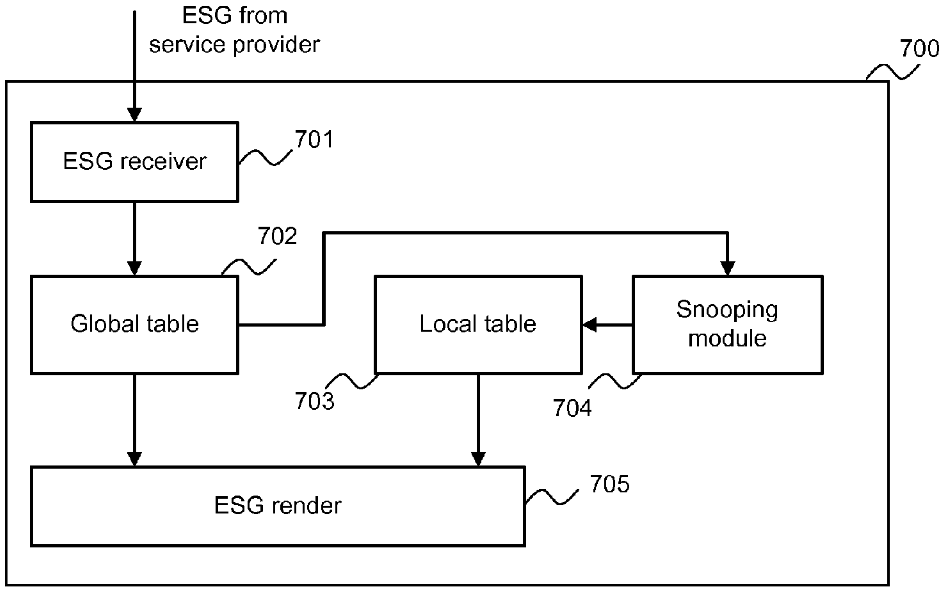
FIG. 7 is a block diagram illustrating a client device for providing dynamically updated channel guide information according to the present embodiment.

FIG. 7 is a block diagram illustrating a device for providing dynamically updated channel guide information according to the present embodiment. The device 700 comprises an ESG receiver 701, a global table 702, a local table 703, a snooping module 704 and an ESG render 705.

The ESG receiver 701 is configured to receive channel guide information from a server and store it in the global table 702;

The Snooping module 704 is configured to snoop multicast packets based on the channel guide information stored in the global table 702 or detect multicast service information presented in physical-layer frame (e.g. Although in IEEE 802.16e wireless network, the multicast frame is used to carry the multicast packets in the physical layer and the multicast frames of unselected multicast services are discarded at physical layer, yet the multicast service information of unselected multicast services can be detected in a frame, e.g. by modifying the physical driver protocol, before the frame is discarded) so as to generate a list of available channels, and store information about the list of available channels into the local table 703; and The ESG render 705 is configured to present the channels based on the received channel guide information and generated available channel list, wherein, the available channels is presented at the top of the presentation list.

According to the present embodiment, the apparatus for providing a multicast service contains the device 700 for rendering the EPG. In addition, the apparatus may further comprise a channel surfing module. The channel surfing module is configured to surf channels by changing channels one after another in such a manner that the available channels are presented prior to the displays of unavailable channels. Moreover, a prompt of "whether or not to surf the unavailable channels" can be added between the displays of available channels and unavailable channels. In this case, only upon the positive response, the channel surfing module surfs the unavailable channels.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations shall fall in the scope of the invention.

The invention claimed is:

1. A method for providing a service guide in a network that provides a plurality of multicast services, said network comprising a client device connected to an access device, wherein, at said client device, said method comprising:

receiving, by said client device, a list of the plurality of multicast services;

determining, by said client device, a subset of said plurality of multicast services that is being multicast to said client device via said access device;

arranging, by said client device, positions for the multicast services of a subset in the list of the plurality of multicast services; and rendering, by said client device, said arranged list of the plurality of multicast services.

2. The method of the claim 1, wherein, the multicast services of said subset are listed in a predetermined position of said list.

3. The method of the claim 2, wherein, said predetermined position is the top of the list.

4. The method of the claim 1, wherein, the multicast services of said subset are listed in sequence in said list.

5. The method of the claim 1, wherein the step of determining the multicast service of the subset, further comprises:

receiving, by said client device, a message including information about the multicast services of said subset; and deriving, by said client device, said information from the message.

6. The method of the claim 1, wherein the step of determining the multicast service of the subset further comprises:

receiving access information used for accessing the multicast services;

snooping packets; and determining said subset of said plurality of multicast services based on said access information and said packets.

7. The method of the claim 6, wherein it further comprises snooping packets periodically during said client device's reception of a multicast service so as to determine the multicast services being multicast by the access device; and rearranging said list of multicast services based on the determined multicast services.

8. The method of the claim 6, wherein said access information comprises multicast group addresses for receiving a plurality of multicast services.

9. The method of the claim 1, wherein it further comprises: determining said subset of said plurality of multicast services based on physical layer frames.

10. The method of the claim 9, wherein it further comprises:

presenting multicast services not belonging to said subset in a one by one manner.

11. The method of the claim 1, wherein it further comprises receiving an instruction for surfing; and presenting the multicast services of said subset in a one by one manner.

12. A client device for providing a service guide in a network providing a plurality of multicast services, wherein, said apparatus connects to an access device, wherein the client device comprises:

a receiver used to receive a list of the plurality of multicast services; and a snooping module used to determine a subset of said plurality of multicast services is being multicast by said access device;

a snooping module to arrange positions for the multicast services of the subset in the list of the plurality of multicast services; and a rendering module to render the arranged list of the plurality of multicast services.

13. The apparatus of the claim 12, wherein, it further comprises a snooping module used to snoop multicast packets based on the list of the plurality of multicast services received by the receiver or detect multicast services presented in physical-layer frame.

14. The apparatus of the claim 12, wherein, it further comprises a channel surfing module used to switch channels in the arranged list one after another.

15. A method for providing a service guide in a network that provides a plurality of multicast services, said network comprising a client device connected to an access device, wherein, at said client device, said method comprising:

receiving, by said client device, a list of the plurality of multicast services;

determining, by said access device, a subset of said plurality of multicast services that is being multicast to said client device via said access device;

arranging, by said access device, positions for the multicast services of a subset in the list of the plurality of multicast services; and rendering, by said client device, said arranged list of the plurality of multicast services.

* * * * *